United States Patent [19]
Dilkes et al.

[11] Patent Number: 5,841,618
[45] Date of Patent: Nov. 24, 1998

[54] POWER-LINE TRIP CIRCUIT

[75] Inventors: Graham Dilkes; Carl C. Ennis, both of Manchester, United Kingdom

[73] Assignee: GEC Alsthom Limited, United Kingdom

[21] Appl. No.: 714,851

[22] Filed: Sep. 17, 1996

[30] Foreign Application Priority Data

Sep. 19, 1995 [GB] United Kingdom ............... 9519086

[51] Int. Cl.⁶ .................................... H02H 3/00
[52] U.S. Cl. ................. 361/110; 361/71; 361/93
[58] Field of Search ............ 361/71–75, 93–94, 361/102, 110, 111, 62–63; 307/97, 131

[56] References Cited

U.S. PATENT DOCUMENTS 4,002,950  1/1977  Dickerson ................................. 361/94

FOREIGN PATENT DOCUMENTS 1 547 672  6/1979  United Kingdom.
2 168 211  6/1986  United Kingdom.
2 274 364  7/1994  United Kingdom.

*Primary Examiner*—Jeffrey A. Gaffin
*Assistant Examiner*—Michael J. Sherry
*Attorney, Agent, or Firm*—Kirschstein, et al.

[57] ABSTRACT

A power-line trip circuit models the transient characteristic of a change in load (e.g. appearance of a fault current, or switch-on to a normal load) and compares the current actually flowing in the power lines with this modelled or simulated transient. Line currents that do have a transient component but do not exceed normal limits are not then sufficient to trip a circuit breaker associated with the power lines, whereas transient-bearing currents that do exceed such limits, i.e. fault currents, are recognized as such and the circuit breaker is tripped. This circuit allows fast, reliable tripping even in the presence of a substantial transient overshoot.

6 Claims, 2 Drawing Sheets

POWER-LINE TRIP CIRCUIT

BACKGROUND OF THE INVENTION

The invention relates to power-line trip circuits, in particular, but not exclusively, power-line trip circuits for autoreclosers.

An autorecloser is a high-voltage reclosing circuit breaker which is used to protect high-voltage overhead electrical power distribution lines. The function of the recloser is to reduce system interruption to a minimum if a transient fault should occur on the system. The recloser senses fault current in the main high-voltage circuit and opens the three main contacts to interrupt the current. After a short period known as the "dead-time", the recloser will reclose. Most faults are transient in nature and will clear during the dead-time so that when the unit recloses the HV supply is restored. If the fault has not cleared the recloser senses the fault current and again opens to interrupt it. The recloser can attempt to reclose up to, say, three times. If the fault is permanent after a predetermined number of trips, it will remain open, thereby isolating the faulty section of line.

Such devices are normally mounted on top of a pole, often in remote places, and because of this efforts are made to make the device as self-contained and maintenance-free as possible. One measure for achieving this is to power the autorecloser by one or more internal, long-life batteries.

A requirement of battery-powered systems is that they should consume the minimum power possible to ensure long battery life. Use of low-power components is one method frequently used, in conjunction with removing power from those components which do not have to come into operation until a fault condition arises.

Protection relays for pole-mounted autoreclosers are microprocessor-based to provide the range of in-built protection functions required. The steady-state power consumption of the microprocessor and its peripheral components is too high for them to be continually powered throughout the expected lifespan of the batteries used in an autorecloser (>10 years expected life). In order to reduce the power consumption to a minimum it is required that the microprocessor and its peripheral components be switched off until a fault condition arises, at which time power is applied to these items. This occurs by means of a so-called "wake-up" command.

It is desirable that a trip be carried out correctly in the minimum time possible. In a standard autorecloser relay, time is taken whilst the relay powers up and recognises the fault condition. Thus, for example, the microprocessor must be held in a reset state while the oscillator crystal stabilises. Time is also required for reference values of fault current to be read into RAM from non-volatile memory, for actual values of line current to be read from the analogue-to-digital converters and for the comparison process to be carried out between these two values, in response to which, if a fault condition is found to exist, the circuit breaker is tripped.

On some autorecloser relays approximately 49 ms are lost before an instantaneous trip signal is applied, a further 20 ms then elapses before the autorecloser actually opens its main contacts. This can be advantageous, in that the autorecloser will not trip due to system switching transients, as any transients will have decayed by the time the microprocessor has come out of reset and read the trip settings, leaving only real faults present on the system. Under these conditions, decreasing the instantaneous tripping time of the circuit breaker would increase the chance of the relay sending out a false trip signal due to system transients. However, there is the significant disadvantage of sluggishness of response.

The effect of system transients can be seen with reference to FIG. 1. When a circuit breaker closes, for example when an autorecloser switches on again after a dead-time, the initial current seen by the protection relay appears to be higher than the actual current flowing. This is due to the fact that the current 10 consists of two components: a constant AC component (e.g. load current) (not shown) and a decaying DC component 11. The DC component decays to zero over approximately four cycles of the AC component. Clearly, if the protection relay within the recloser senses the current waveform too close to the initial switching-on point (the origin of the waveform in FIG. 1), and it turns out that the AC component of the current does not represent a fault current, but a normal load current, a trip command will be issued in error.

It is an aim of the present invention to provide a power-line trip circuit which enables a fast, reliable tripping operation to be carried out (e.g. of the order of 10 ms) even in the presence of system transients.

SUMMARY OF THE INVENTION

In accordance with the invention, there is provided a power-line trip circuit for an autorecloser, comprising a detection means for detecting the presence of an over-current in power lines with which said autorecloser is associated, a transient simulation means for simulating characteristics of a transient component of said over-current when said over-current appears, said transient simulation means having an input connected to said detection means and an output for providing a signal possessing said simulated transient characteristics, a comparison means for comparing said signal possessing said simulated transient characteristics with a signal proportional to current flowing through said power lines, and a circuit-breaker tripping means for tripping a circuit breaker associated with said power lines, said circuit-breaker tripping means being connected to an output of said comparison means, the trip circuit being arranged to trip said circuit breaker only when an amplitude of said signal proportional to current exceeds an amplitude of said signal possessing said simulated transient characteristics.

The detection means may comprise a comparator having a first input for receiving said signal proportional to current, a second input for receiving a reference signal defining a minimum value of over-current and an output for providing a voltage level indicative of the presence of an over-current.

The transient simulation means may comprise an R-C network having an input fed from said output of said comparator and an output connected to an input of the comparison means. The R-C network may have a further input fed from a voltage reference, said comparator and said R-C network being arranged such that, when an over-current is detected, a potential difference is set up during operation of the trip circuit between the output of the comparator and said voltage reference and a signal at said output of said R-C network follows a capacitor-discharge-type characteristic.

Said R-C network may be configured such that a start of said capacitor-discharge-type characteristic corresponds to at least a maximum expected value of said transient component and a time constant of said capacitor-discharge characteristic is greater than or equal to a time constant of said transient component.

The trip circuit may be arranged to issue a wake-up signal to a microprocessor controlling the operation of said autorecloser, said wake-up signal being issued substantially at the same time as said circuit breaker is tripped.

BRIEF DESCRIPTION OF THE DRAWINGS

An embodiment of the invention will now be described, by way of example only, with reference to the drawings, of which.

DETAILED DESCRIPTION OF AN EMBODIMENT OF THE INVENTION

Figure 1:
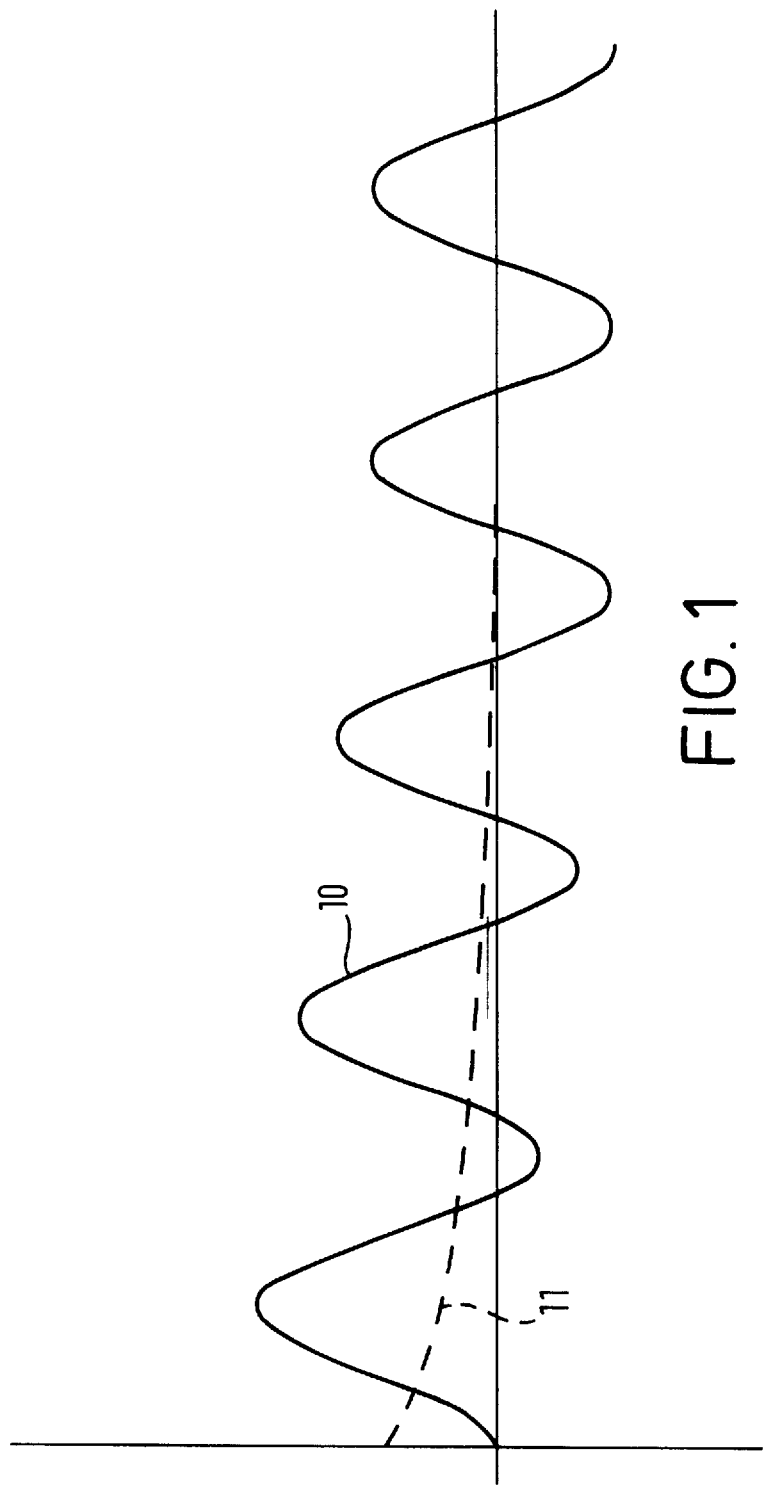
FIG. 1 is a waveform diagram showing a typical power-line current characteristic at recloser switch-on, and FIG. 2 is a circuit diagram of a power-line trip circuit according to the invention.
Figure 2:
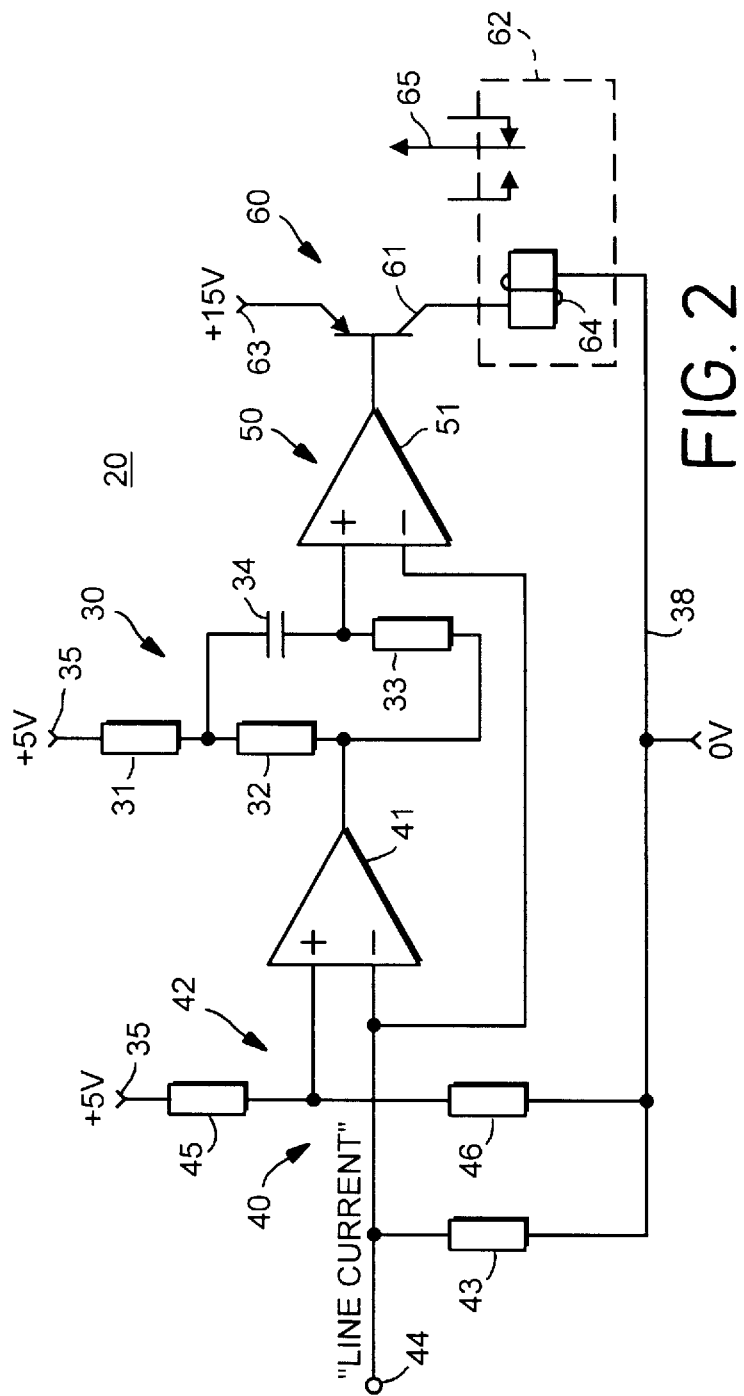

Referring now to FIG. 2, in a power-line trip circuit 20 according to the invention the transient characteristic 11 of FIG. 1 is modelled by a transient simulation means consisting of an R-C network 30. R-C network 30 is composed of three resistors 31, 32 and 33 and a capacitor 34, resistor 33 and capacitor 34 being connected in parallel with resistor 32, this parallel combination being in turn connected in series with resistor 31 between a first voltage reference 35 and the output of a comparator 41.

The values of the R-C network are selected to provide an "X/R" value slightly in excess of that of the power system to which the circuit breaker is connected. The system X/R value corresponds to a ratio of the system inductive reactance to the system resistance and may, in a typical system, have a value of approximately 25. This will give rise to a transient having a maximum (initial) value of approximately 2.5 times the rms value of the line current and a time constant of approximately 5 cycles of the AC waveform. Thus, the R-C network will be set to an X/R ratio of, perhaps, 27.

Comparator 41, which forms part of a detection means 40 has a positive input connected to the mid-point of a potential divider 42 consisting of resistors 45, 46. Resistor 45 is connected to the first voltage reference 35 and resistor 46 is connected to a second voltage reference, e.g. ground, 38. The negative input of comparator 41 is connected to the second voltage reference 38 by way of a resistor 43 and to a "line current" input 44. A DC current is made to flow through resistor 43 via input 44 which is proportional to the peak of the current flowing through the power lines and the circuit breaker contacts, so that the voltage across this resistor is a measure of the peak line current.

Input 44 is also connected to a comparison means 50 in the form of a second comparator 51, the negative input of comparator 51 being fed from input 44. The positive input of comparator 51 is connected to the junction of resistor 33 and capacitor 34. The output of the comparator 51 is taken to a circuit-breaker tripping means 60 comprising a PNP transistor 61 and a trip relay 62. The emitter of transistor 61 is connected to a power line 63, while the collector of transistor 61 is taken to ground via the energising coil 64 of the trip relay 62. The base of transistor 61 is fed from the output of the comparator 51.

Under normal load conditions, only comparator 41 and comparator 51 will have power supplied to them; power is withheld from the driver transistor 61 and the microprocessor (not shown) controlling the normal autorecloser functions (e.g determination of dead-time, etc).

As already mentioned, the current through resistor 43 is proportional to load current flowing through the circuit breaker contacts. As long as the load current is within normal limits, the voltage at the negative input of the comparator 41 will be less than the voltage at the positive input and the output of comparator 41 will be high, nominally at the same potential as the voltage reference 35. Thus, capacitor 34 is held in a uncharged state. When, now, a fault condition arises, the voltage across resistor 43 increases, rising above the voltage at the positive input of comparator 41, and the output of the comparator drops to a low potential, nominally to ground potential 38. This causes current to flow in the R-C network 30, allowing capacitor 34 to charge up.

As capacitor 34 charges, the voltage seen by resistor 33 decreases until a point is reached at which, assuming now there is a fault current in the power lines, this voltage is less than the "fault current" voltage across resistor 43, causing the output of comparator 51 to fall, thereby switching on transistor 61 and energising the trip relay 62. This sends a "trip" signal along a line 65 to the circuit breaker (not shown), breaking the contacts of the circuit breaker and interrupting the power lines (not shown).

The values of resistor 33 and capacitor 34 are selected to produce a decay rate of the voltage across resistor 33 which is slightly greater than that of the DC component 11 in FIG. 1. The values of resistors 31 and 32 are chosen so that the initial value of the transient-characteristic voltage appearing across resistor 33 corresponds to slightly more than the maximum transient current expected in the system.

When the line current is a normal load current, it will not exceed the simulated transient signal and the transistor 61 will not be switched on. This is ensured by arranging for the X/R ratio of the network to be somewhat greater than that of the system, as mentioned earlier. Thus, the voltage at the junction of resistor 33 and capacitor 34 will always be higher than that across resistor 43 due to a line transient. However, where the line current is a fault current, the instantaneous amplitude of the transient characteristic appearing on the positive input of comparator 51 is exceeded by a peak amplitude of the AC waveform appearing on the negative input of comparator 51, so that the transistor 61 then turns on and trips the circuit breaker. The response time of this circuit is approximately 10 ms.

At the same time as the trip signal is sent out to the circuit breaker, a "wake-up" signal is issued to the microprocessor (not shown). The microprocessor is then re-activated and takes over control of the circuit breaker for the rest of the autoreclose sequence, as required by the protection characteristics programmed into the microprocessor.

While it has been assumed that resistor 43 passes a current proportional to the peak of the line current, some other related parameter may be chosen instead, e.g the rms value.

We claim:

1. A power-line trip circuit for an autorecloser, comprising:

a detection means for detecting the presence of an over-current in power lines with which said autorecloser is associated, the detection means having an input connected to an input of the trip circuit, said trip-circuit input receiving, in use, a signal representative a value of current flowing in said power lines, a transient simulation means for simulating characteristics of a decaying transient component of said over-current when said over-current appears, said transient simulation means having an input connected to an output of said detection means and an output for providing a signal possessing said simulated transient characteristics, a comparison means for comparing said signal possessing said simulated transient characteristics with a signal proportional to current flowing through said power lines, said comparison means having a first input connected to said trip-circuit input and a second input connected to said output of said transient simulation means, and a circuit-breaker tripping means for tripping a circuit breaker associated with said power lines, said circuit-breaker tripping means being connected to an output of said comparison means, the trip circuit being arranged to trip said circuit breaker only when an amplitude of said signal proportional to current exceeds an amplitude of said signal possessing said simulated transient characteristics.

2. A power-line trip circuit as claimed in claim 1, in which the detection means comprises a comparator having a first input connected to said trip-circuit input, a second input for receiving a reference signal defining a minimum value of over-current and an output for providing a voltage level indicative of the presence of an over-current, said output being connected to said input of said transient simulation means.

3. A power-line trip circuit as claimed in claim 2, in which said transient simulation means comprises an R-C network having an input fed from said output of said comparator and an output connected to said second input of said comparison means.

4. A power-line trip circuit as claimed in claim 3, in which said R-C network has a further input fed from a voltage reference, said comparator and said R-C network being arranged such that, when an over-current is detected, a potential difference is set up during operation of the trip circuit between the output of the comparator and said voltage reference and a signal at said output of said R-C network follows a capacitor-discharge-type characteristic.

5. A power-line trip circuit as claimed in claim 4, in which said R-C network is configured such that a start of said capacitor-discharge-type characteristic corresponds to at least a maximum expected value of said transient component and a time constant of said capacitor-discharge characteristic is greater than or equal to a time constant of said transient component.

6. A power-line trip circuit as claimed in claim 1, in which the trip circuit is arranged to issue a wake-up signal to a microprocessor controlling the operation of said autorecloser, said wake-up signal being issued substantially at the same time as said circuit breaker is tripped.

* * * * *